(12) United States Patent
De Luca

(10) Patent No.: US 10,390,415 B2
(45) Date of Patent: Aug. 20, 2019

(54) SYNCHRONIZED LIGHTING SYSTEM AND CONTROL OF RANDOMLY PLACED LIGHTS

(71) Applicant: Create Technologies, Inc., Carson City, NV (US)

(72) Inventor: Nicholas P. De Luca, Carmel-by-the-Sea, CA (US)

(73) Assignee: Create Technologies, Inc., Carson City, NV (US)

( * ) Notice: Subject to any disclaimer, the term of this patent is extended or adjusted under 35 U.S.C. 154(b) by 0 days.

(21) Appl. No.: 15/859,579

(22) Filed: Dec. 31, 2017

(65) Prior Publication Data

US 2019/0208600 A1    Jul. 4, 2019

(51) Int. Cl.
*H05B 37/02* (2006.01)
*H05B 33/08* (2006.01)
*H04L 29/08* (2006.01)

(52) U.S. Cl.
CPC ....... *H05B 37/029* (2013.01); *H05B 37/0227* (2013.01); *H05B 37/0245* (2013.01); *H05B 37/0272* (2013.01); *H05B 37/0281* (2013.01); *H04L 67/12* (2013.01); *H05B 33/0869* (2013.01)

(58) Field of Classification Search
CPC ............ H05B 37/0227; H05B 37/0245; H05B 37/0272; H05B 37/0281; H04N 5/2256; H04N 9/3155

USPC ................................................ 315/152, 307
See application file for complete search history.

(56) References Cited

U.S. PATENT DOCUMENTS

| | | | | |
|---|---|---|---|---|
| 6,812,970 | B1 * | 11/2004 | McBride | G08B 13/19619 348/151 |
| 2009/0002265 | A1 * | 1/2009 | Kitaoka | G09G 3/003 345/4 |
| 2016/0301932 | A1 * | 10/2016 | Kurokawa | H04N 19/44 |
| 2017/0105265 | A1 * | 4/2017 | Sadwick | A61N 5/0618 |
| 2018/0376566 | A1 * | 12/2018 | Newton | H05B 33/0857 |
| 2019/0069375 | A1 * | 2/2019 | Baker | H05B 37/0227 |

* cited by examiner

*Primary Examiner* — Tung X Le
(74) *Attorney, Agent, or Firm* — Capitol City TechLaw; Jasbir Singh

(57) ABSTRACT

A device for controlling lights that are placed in a random fashion on an object or surface and easily synchronized to form a pattern of illumination is disclosed. The device includes a combination of lights, each with the separate ability to be turned on or off in a timed fashion and further may include the ability to change color or intensity. The process for synchronizing the lights including the steps of recognizing the order of lights on the object via a camera, overlaying a pattern desired upon the image captured by the actuation of each of the lights, determining the color, intensity, and frequency of lighting of each of the lights required based on the overlayed image so as to create a lighting actuation algorithm, transmitting part or all of the information of the control algorithm to each of the lights, and further operating the complete system through a common time.

17 Claims, 5 Drawing Sheets

SYNCHRONIZED LIGHTING SYSTEM AND CONTROL OF RANDOMLY PLACED LIGHTS

FIELD

The present disclosure teaches a device for controlling lights that are placed in a random fashion on an object or surface so as to obtain a synchronized pattern of illumination. The device includes a combination of lights, each with the separate ability to be turned on or off in a sequential fashion and further may include the ability to change color or intensity. The process for programming the lighting including the steps of an initial visual recognized code transmitted by each of the bulbs and received by a camera, overlaying a pattern desired upon the image captured by the actuation of each of the lights, determining the color, intensity, and frequency of lighting of each of the lights required based on the overlayed image so as to create a lighting actuation algorithm, transmitting part or all of the information of the control algorithm to each of the lights, and further operating the complete system through a common time.

BACKGROUND

The use of lights for functional and decorative purposes is wide spread throughout society. Small decorative lights used especially during the holidays around trees or other objects or surfaces are normally electrically connected in series and consist of hundreds of bulbs. These bulbs are wrapped around a multitude of various objects including trees or bushes, poles, along roof lines, gutters, gables, and many other objects or surfaces.

While the control of each individual bulb in such strings is not controllable on its own, it is common that each bulb may be turned on or off by using a switch inside each bulb that consists of a thin sheet of metal that bends when hot and thus can deactivate when hot and reactivate when cool. Other light actuation systems for string light such as that described by Hering et al. in U.S. Pat. No. 8,680,773 activate alternately using LED chips that activate based on the polarity of the alternating signal. Wang in U.S. Pat. No. 9,159,253 creates a visual effect by physically positioning the lights in a non-random fashion within a physical space. These systems rely on non-random placement of the bulbs to create patterns or the use of a simple on-off activation patterns.

The control of lights by using a coded visual signal in an exterior light is an alternative method to control the actuation of string lights such as described by Readler in U.S. Pat. No. 9,386,667. Kidakarn in U.S. Pat. No. 9,398,670 describes one or more strings of lights that are remotely controlled WiFi or Bluetooth protocol to an external device and further integrated with musical tones. Like Wang, Kidakarn also relies on non-randomly placed bulbs, for example in a holiday symbol.

The use of light emitting diodes in a string manner is also seen in the prior as described by Tveit in U.S. Pat. No. 8,944,632. Sylvania manufactures an LED light strip SYL-73661 that can tuned to various color. The strip does not allow for the selective activation based on the random placement of the LED strip as the entire strip is actuated. Sylvania also manufactures a single bulb termed a Smart Bulb A19 that can be controlled by an Apple I Phone and tuned to various colors. The control of hundreds of these individual bulbs to create a pattern would be an extremely laborious and difficult task to accomplish.

SUMMARY

The present teachings provide embodiments of a control system for a string lighting system, and features thereof, which offer various benefits. The system can employ multiple bulbs, placed on a surface or an object in the form of a string that further has a central control unit to activate each bulb. Each bulb having a coded switch that allows for discrete functionality and the actuation further resulting from a control algorithm. The process for creating a control algorithm includes a timing of actuation for each bulb as well as color and brightness for each bulb is derived from an overlay of a visual image taken of the object and bulbs onto a predetermined image or lighting scheme to promote effective use of the devices and methods disclosed herein.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention, and together with the description serve to explain the principles of the invention.

Figure 1:
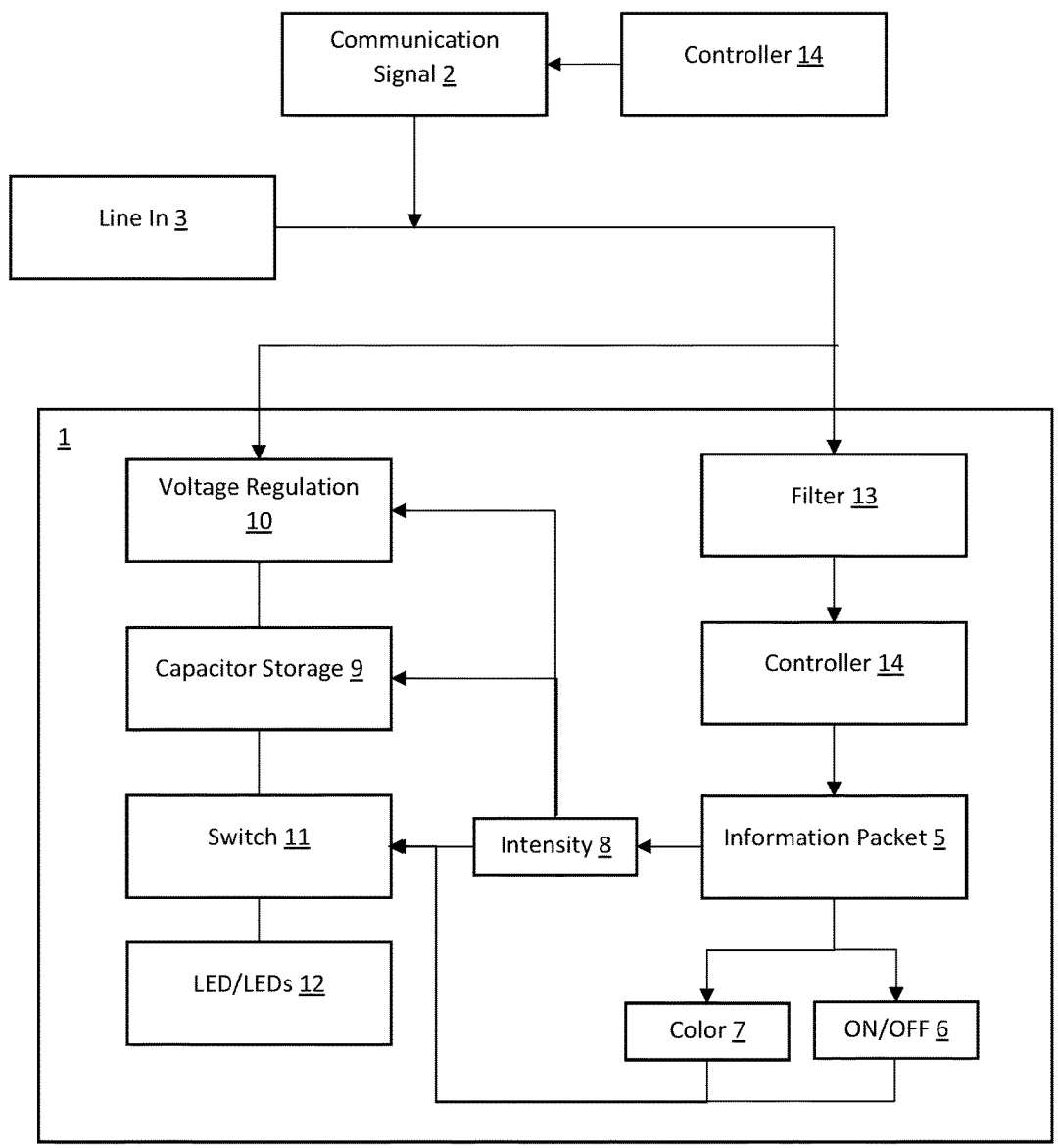
FIG. 1 is a schematic diagram illustrating a single bulb as part of a string of bulbs in a synchronization system for randomly arranged lights.

Throughout the drawings and the detailed description, unless otherwise described, the same drawing reference numerals will be understood to refer to the same elements, features, and structures. The relative size and depiction of these elements may be exaggerated for clarity, illustration, and convenience.

DESCRIPTION

The present teachings disclose a device for efficiently synchronizing as assembly of lights that are randomly placed upon an object or surface with a design or intended design outcome including frequency, color, and intensity of light. The present teachings also disclose a process to easily create patterns of light within specific areas without requiring the specific placement of bulbs within that region.

The current teachings allow for the ease of modifying the lighting pattern of a randomly placed assembly of bulbs or LEDs by using a handheld image processing device.

The current teachings disclose a light string that using a single controller may control an unlimited number of bulbs and further synchronize the color, intensity, and frequency of the bulbs.

The current teachings describe a novel manner to modulate the color, brightness, and frequency of a random assembly of lights to match a predetermined or dynamic design pattern.

The current teachings disclose a synchronization system for lighting that can be used for objects with complex surfaces as well as surfaces.

The current teachings disclose a string lighting system that can be easily manufactured and requires minimal set-up time to achieve synchronicity.

FIG. 1 is a schematic diagram illustrating a single bulb as part of a string of bulbs in a synchronization system for randomly arranged lights.

FIG. 1 illustrates a primary lighting element 1 that may be strung in a series along an electrical wiring from a primary energy source 3. A specific communication signal 2 transferred over the primary line signal 3 via controller 14. The communication signal 2 may be a high frequency electrical signal superimposed upon the dc power or the 50 hz or 60 hz primary 120V-240 volt power line. Each primary lighting element 1 is fitted with a filter 13 so as to be able to receive the communication and decipher the information packet 5 once the code acceptance 4 has been verified. Said code acceptance 4 may be a binary or analog signal that presents a unique code relating only to that specific bulb. The information packet may include information such as on-off timing 6 as well as color 7 and intensity 8 of the light. The information packet may be sent at a very high frequency that might easily control the single light unit at a rate that is much faster than that normally perceived by the brain. In this way, the signal may be live and not require further memory or CPU at the single bulb node. The information packet further allowing for the control of the switch 11 that releases energy from the capacitor storage 9. The information packet may also include "future event" information such as the next charge to voltage level such that the capacitor storage 9 and voltage regulator 10 are correctly modulated to achieve the correct intensity of the LED, LEDs, or bulb.

Figure 2:
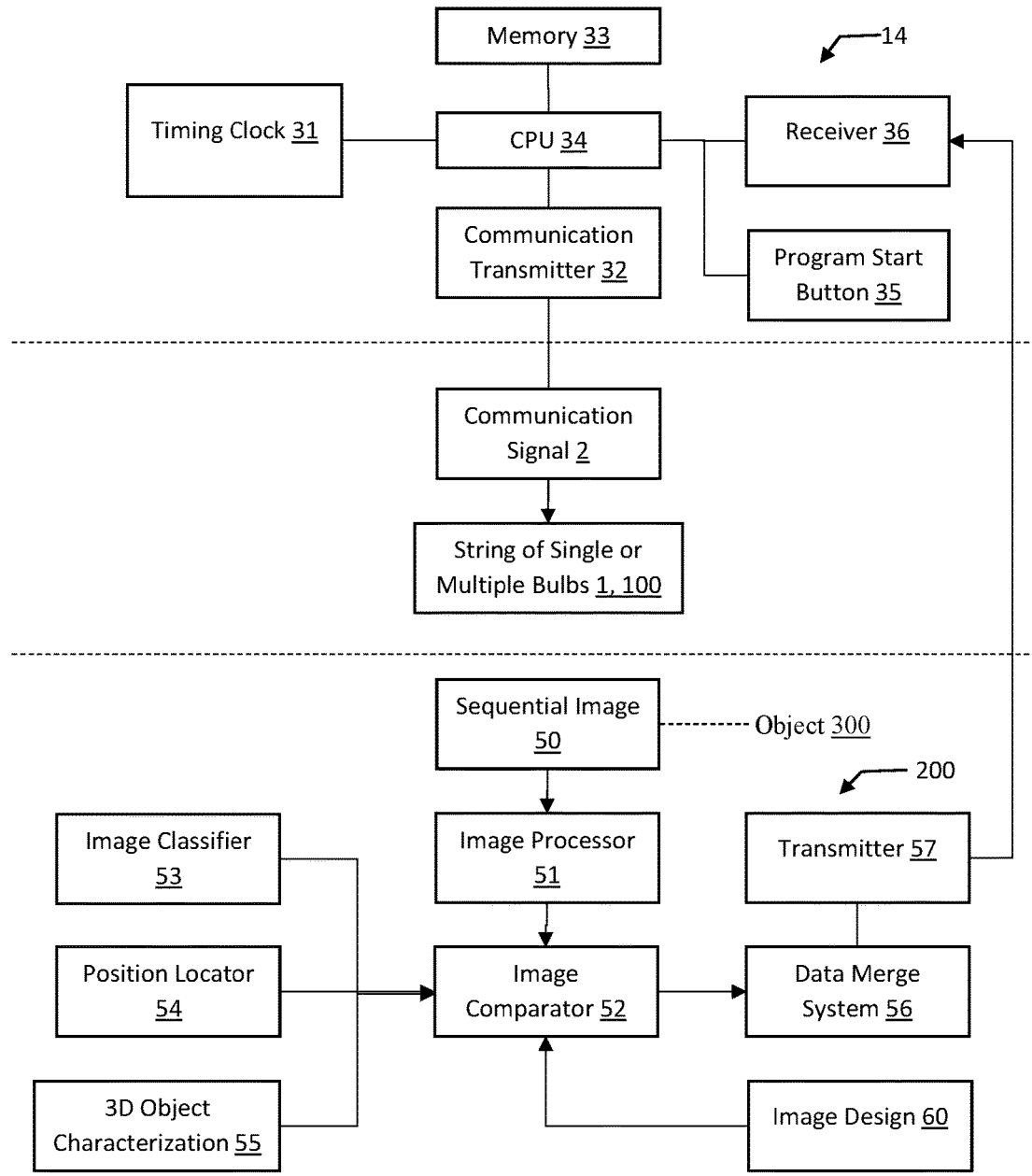
FIG. 2 is a schematic diagram illustrating the details of the bulb controller as well as the components of the image processing system used to determine the on/off pattern, the color, and the intensity of the randomly placed bulbs.

FIG. 2 is a schematic diagram illustrating the details of the bulb controller 14 as well as the components of the image processing system 200 used to determine the on/off pattern, the color, and the intensity of the randomly placed bulbs through the communication signal 2 passed through the string of single or multiple bulb units 1 or 100.

The bulb controller 14 consists of a microprocessor CPU 34 that may have an internal or external clock 31 and memory allocation 33. A single bulb controller may control a single bulb, multiple bulbs either individually, on strands, or on multiple strands. Further, strands 100 may be connected together in series end-to-end as is common and the communication transmitter 32 may transmit to all bulbs.

Upon starting a typical synchronization process, a start button 35 may be pressed or an external signal may activate the synchronization process by sending a signal to the receiver which is further connected to the string of lights. A synchronization cycle may consists of an initial pattern of all lights flashing or simply of the first bulb in the sequence flashing. The indication may use time or color modulation; for example all bulbs could turn blue and red intermittently and the then the first bulb in the series during synchronization could turn green. The sequential imager 50 placed in a fixed location then registers which light turned on first, second, third, etc. until and end signal is registered or the first bulb is recorded again. The process may be repeated from multiple locations physically around the object in order to record all the light locations and the image processor 51 creates a database of the locations.

An image classifier 53, such as a deep learning system, may be used to further characterize the object so as to help to create a three dimensional model of the object and help to "fit" the bulbs on the surface. Such a system could detect that a pine tree is the object that the lights are attached to and therefore attempt to model a conical surface as the one the bulbs are located upon. The model can then be further used by the design software to assist in forming decorative patterns.

A position locator 54 can also be used to assist in creating the model of the object as the camera 50 is moved around the object. In addition, a three dimensional model of the object may be created by 55 using ultrasonics, multiple camera lenses, and other depth sensors.

Data obtained from the image classifier 53, the position locator 54, and the three dimensional characterization system 55 are integrated into the primary captured images by the image comparator 52 so as to cross reference the sequential bulbs to their position on the object. The data from the image comparator 52 may be further applied by the design software 60 to help create an overlay pattern on the object upon which the lights 1 and 100 are attached. For example, colors can be chosen for specific regions, or shapes can be created to appear to move across surfaces.

Once the design is complete it is combined with the data set from the image comparator and each of the lights is defined by their relative start time to other bulbs, flash frequency, color and intensity, the entire data set is transferred to the controller 14 and receiver 36 via transmitter 57. Transmitter 57 may use protocol such as blue tooth or Wifi.

Figure 3:
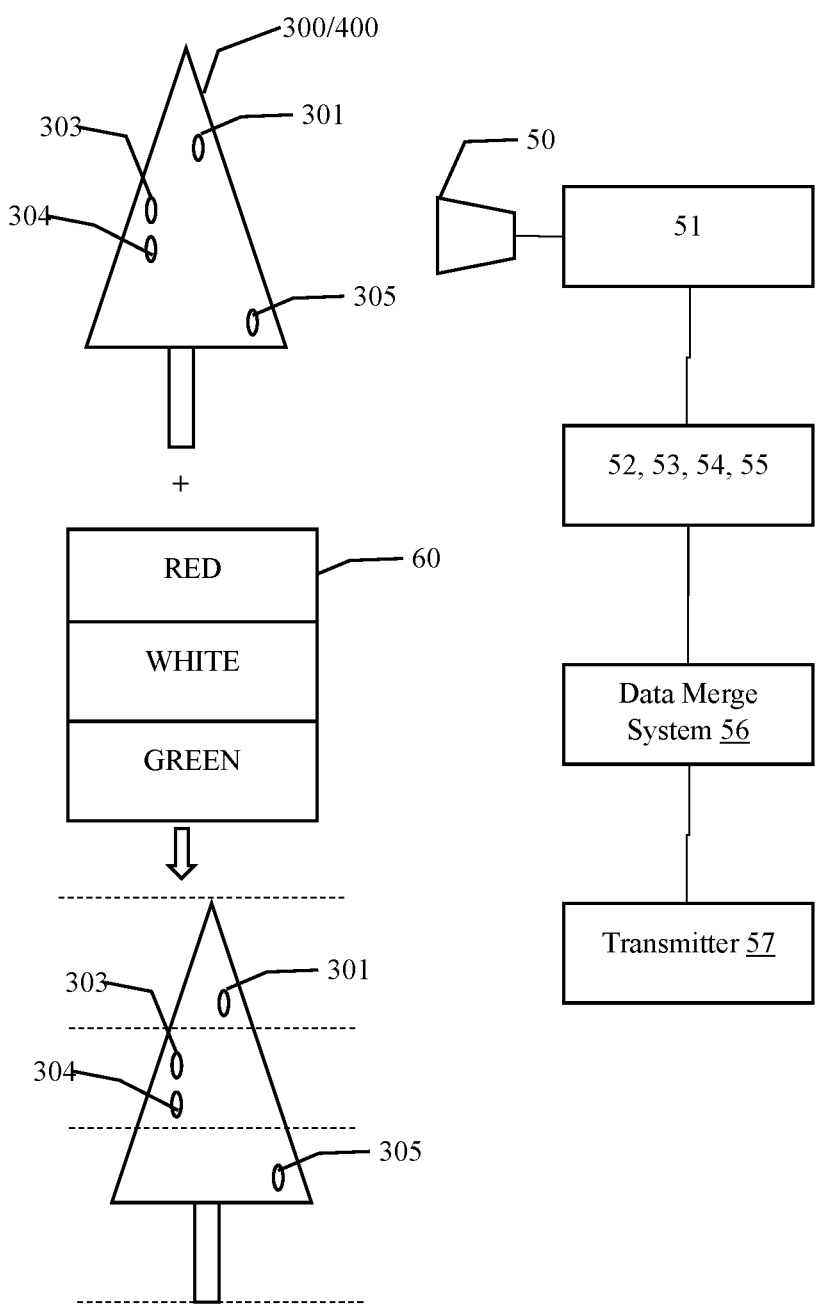
FIG. 3 is a schematic diagram showing the process of combining a design with the image captured of the object decorated with the randomly placed lights so as to yield a synchronized display.

FIG. 3 is a schematic diagram showing the process of combining a design 60 with the image captured 400 of the object 300 decorated with the randomly placed lights 301, 302, 303, 304, and 305 so as to yield a synchronized display.

The visual imager 50 which could be that within a device such as an Apple I Phone as well as the image processor 51 and image classifier 53, position locator 54, and 3D object characterizer 55. The data merge software 56 creates a combined image with lights 301 in the red area, lights 302, 303, and 304 in the white, and light 305 in the green. The transmitter 57 transfers the information back to the receiver 36 which then activates the lights accordingly.

Figure 4:
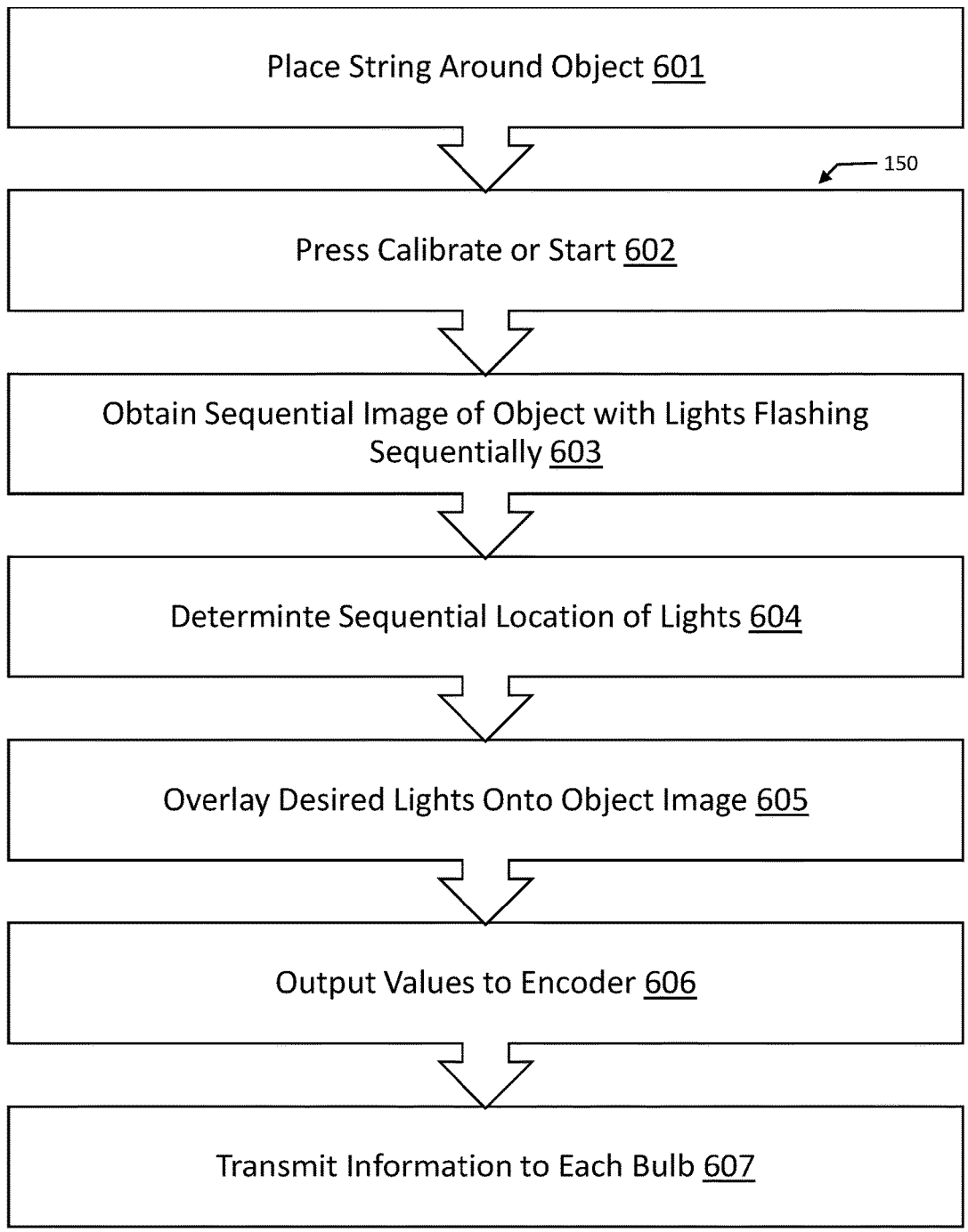
FIG. 4 is a schematic diagram illustrating the process of establishing a synchronized display of lights using a string of lights that are randomly wrapped around an object.

FIG. 4 is a schematic diagram illustrating the process 150 of establishing a synchronized display of lights using a string of lights that are randomly wrapped around an object.

The process of FIG. 4 first involves randomly or semi-randomly placing a string of lights around an object or on a surface as step 601. The calibration sequence can then be initiated by pressing a start button on the string in step 602 or having an external signal activate the synchronization step. In step 603, the lights are sequentially turned on and off so as to allow the location of the lights to be determined in 604 using the image processing system. Overlaying the design or light scheme on the processed image in step 605 and further creating a "recipe" file of values (that may include color, intensity, frequency of illumination) to be encoded for each bulb as a function of time in step 606. The transmission of the "recipe" file is then transmitted in 607.

Figure 5:
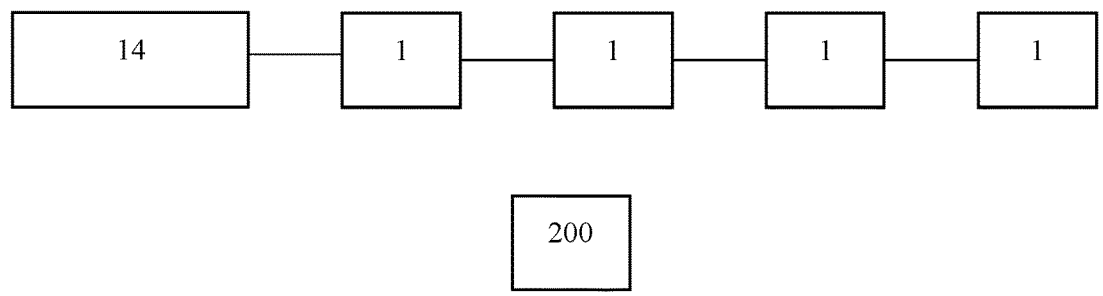
FIG. 5 is a schematic representation of a string of lights with a controller as well the image processing system.

FIG. 5 is a schematic representation of a string of lights 1 with a controller 14 as well as the separate image processing system 200.

The examples presented herein are intended to illustrate potential and specific implementations. It can be appreciated that the examples are intended primarily for purposes of illustration for those skilled in the art. The diagrams depicted herein are provided by way of example. There can be variations to these diagrams or the operations described herein without departing from the spirit of the invention. For instance, in certain cases, method steps or operations can be performed in differing order, or operations can be added, deleted or modified.

What is claimed is:

1. A lighting system comprising:
    one or more electrically activated lights placed upon a surface or object, wherein each of the electrically activated light is attached to a discrete control circuit and incorporating a switch and communication means to receive an information packet providing information on the associated on time for the light;
    an image processing system comprising:
        a camera to obtain sequential images of the lights over time during the synchronization process,
        an image processor to correlate the position of each of the lights with the object or surface during the synchronization process,
        a data merge system to overlay a desired lighting scheme with each of the positioned lights on the object or surface during the synchronization process,
        a transmitter, and
        a receiver to accept information from the image processing system.

2. The system of claim 1, wherein the discrete electrical circuit attached to each light includes a low pass or high pass filter.

3. The system of claim 1, wherein the discrete electrical circuit attached to each light includes a voltage regulator.

4. The system of claim 1, wherein the discrete electrical circuit attached to each light includes a code sensor to associate the information packet received with the light.

5. The system of claim 1, wherein the lights are on a string in electrical series so as to share power from the same source.

6. The system of claim 5, wherein the communication system sending the information to each of the lights uses the same wires that are used to transmit the electrical power.

7. The system of claim 1, wherein the image processing system are placed on.

8. The system of claim 1, wherein the image processing system includes a means for classifying the object or surface the lights are placed on.

9. The system of claim 1, wherein the image processing system includes design software that overlays a desired light pattern with the image acquired by the camera.

10. The system of claim 1, wherein the information packet includes information on the color of the light.

11. The system of claim 1, wherein the information packet includes information on the brightness of the light.

12. The system of claim 1, wherein the information packet includes information on the frequency of lighting.

13. The system of claim 1, wherein the object upon which the bulbs are placed is a tree or home.

14. The system of claim 1, wherein the information transmitted includes the color of each light.

15. A process for lighting an object or surface comprising:
    providing a primary lighting device comprised of one or more electrically activated lights, each attached to a discrete control circuit incorporating a switch and communication means to receive an information packet providing information on the associated on time for the light;
    providing an image processing system comprising a camera, an image processor, a data merge system, and a transmitter to obtain sequential images of the lights over time during a synchronization process, and
    providing a receiver to collect information from the image processing system and further transfer information to the one or more lights.

16. The process of claim 15, wherein the information transmitted includes the color of each light.

17. A process for synchronizing randomly placed lights upon an object or surface comprising:
    providing a calibration start time;
    obtaining sequential images of the object as the light or lights flash independently in order;
    determining the location of the lights on the object or surface;
    overlaying a desired lighting scheme onto the image or images of the object;
    determining a lighting timing sequence based on the overlaid lighting scheme, and
    transmitting the coded scheme to the receiver and to each bulb.

* * * * *